UNITED STATES PATENT OFFICE.

JAMES KERR, OF BOSTON, MASSACHUSETTS, ASSIGNOR TO WILLIAM H. TOWERS, OF SAME PLACE.

IMPROVEMENT IN FLAVORING, COATING, AND PUTTING UP TOBACCO.

Specification forming part of Letters Patent No. 137,084, dated March 25, 1873.

*To all whom it may concern:*

Be it known that I, JAMES KERR, late of Montreal, in the Province of Quebec, Dominion of Canada, now of Boston, in the county of Suffolk and State of Massachusetts, have made a new and useful Improvement in Flavoring Tobacco and preparing the same for more convenient use; and I hereby declare the following to be a full and exact description of the same.

This invention consists in a new manufacture of tobacco in a form suitable for chewing, so as to improve the flavor, preserve the fine qualities of the tobacco, prevent waste in using, and make it more cleanly and inodorous.

The following description will enable any one skilled in the art to make and use my invention.

This invention is applicable to either fine-cut or plug chewing-tobacco. I take good plug-tobacco, such as is used for chewing, cut it into blocks or lumps, so that each piece is sufficient for one "chew," and coat these pieces with a mucilage, such, for example, as that made with gum arabic or other mucilaginous material. After it is partly dried I cover the whole with powdered sugar, flavored with pleasant extracts or other flavoring matter, and then complete the drying. To apply the invention with "fine-cut," it is first formed into pellets or lumps, and these pellets or lumps then treated as the pieces of plug-tobacco described above. The article thus formed is put into packages or boxes for use.

The mucilaginous coating preserves all the qualities of the tobacco, and the sugaring and flavoring give a pleasant taste. The tobacco is not affected by time or weather, and is exceeding neat, clean, and convenient for use.

What I claim, and desire to secure by Letters Patent, is—

1. The improved process herein described for flavoring and putting up tobacco, the same consisting in forming it into small pieces, covering these with mucilage or gum and sugaring, as set forth.

2. The improved article of manufactured tobacco, coated, flavored, and put up for use as set forth.

JAMES KERR.

Witnesses:
  WM. H. TOWERS,
  JOS. H. WHITMAN.